Figure 1:
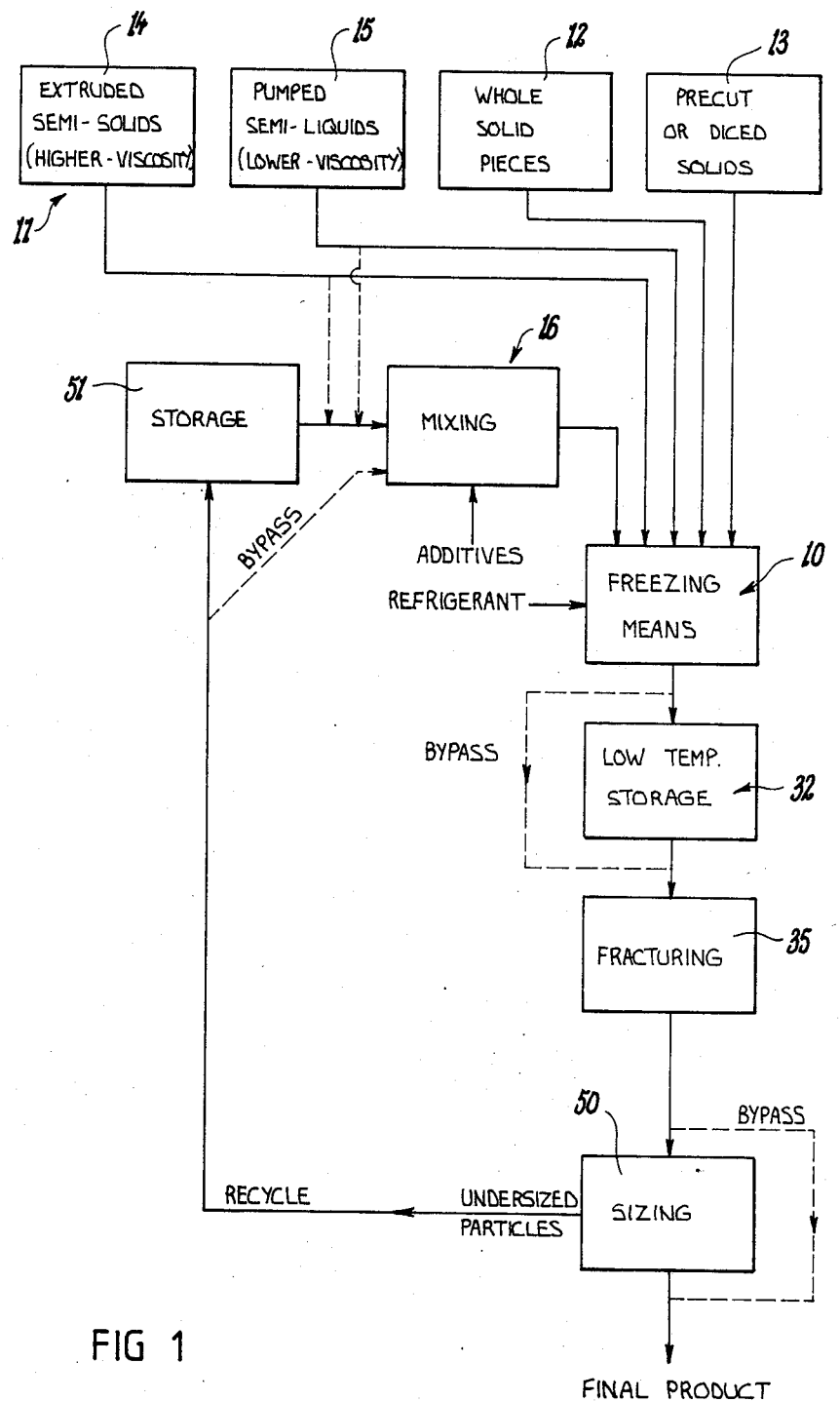

United States Patent [19]

Vitkovsky

[11] Patent Number: 4,687,672
[45] Date of Patent: Aug. 18, 1987

[54] METHOD AND APPARATUS FOR PREPARING FROZEN FREE-FLOWING FOOD PARTICLES

[75] Inventor: Eugene C. Vitkovsky, Alexandria, Australia

[73] Assignee: L'Air Liquide, Societe Anonyme Pour l'Etude et L'Exploitation des Procedes Georges Claude, Paris, France

[21] Appl. No.: 668,827

[22] Filed: Nov. 6, 1984

[30] Foreign Application Priority Data

Nov. 7, 1983 [AU] Australia .............................. PG2246

[51] Int. Cl.$^4$ ......................... A23L 3/36; B02C 23/08
[52] U.S. Cl. ..................................... 426/524; 62/320;
241/3; 241/DIG. 37; 426/518
[58] Field of Search ............... 426/524, 518; 241/82.5,
241/DIG. 37, 65, 97, 3; 62/320, 64

[56] References Cited

U.S. PATENT DOCUMENTS

| | | | |
|---|---|---|---|
| 2,583,697 | 1/1952 | Hendry et al. ........................ 62/320 |
| 3,900,579 | 8/1975 | Masuda et al. ....................... 426/518 |
| 4,090,669 | 5/1978 | Lermuzeaux ................ 241/DIG. 37 |
| 4,428,535 | 1/1984 | Venetucci ................... 241/DIG. 37 |
| 4,441,659 | 4/1984 | Marklund .............................. 241/97 |
| 4,512,523 | 4/1985 | Higashimoto ...................... 241/82.5 |

Primary Examiner—George Yeung
Attorney, Agent, or Firm—Young & Thompson

[57] ABSTRACT

The invention provides a method and apparatus for preparing frozen free-flowing particles of food product. Particles of solid food are supplied, or viscous food material is extruded, or liquid or semi-liquid food material is pumped through apertures, to a freezing stage. In the freezing stage, cryogenic substance is used to freeze the food material to a temperature at which the material is frangible. The frangible food material passes to a fracturing stage such as a fracturing mill, which produces frozen food particles of a size small enough to pass through discharge apertures of the fracturing stage. The discharged particles are screened to remove undersized particles which are recycled, the remaining frozen particles being generally within a defined size range and constituting the final product.

2 Claims, 5 Drawing Figures

METHOD AND APPARATUS FOR PREPARING FROZEN FREE-FLOWING FOOD PARTICLES

This invention relates to methods and apparatus for preparing frozen free-flowing particles of food product. One possible relevant field, but one to which the present invention is not limited, is the preparation of frozen free-flowing particles of food materials for adding to or depositing on other processed or unprocessed food products, such as deposition on preformed pastry or cake bases or, say, adding the particles to prepared meals, ice cream, desserts or other food preparations. Alternatively, the particulate product may be packaged in the frozen state as a saleable final product itself for domestic, commercial or industrial consumers.

The use of frozen free-flowing topping materials for depositing onto preformed pastry or cake bases can provide many advantages over current methods. For example, current commercial practice in the preparation of frozen pizzas is to produce and process the topping materials at chilled or warm temperatures. These topping materials generally comprise tomato sauce, diced or shredded cheese, diced ham, pineapple, mushrooms, salami, mincemeat, etc. The topping materials are produced from commercially available raw or processed materials. The materials are generally deposited on the pizza bases in the chilled or warm state.

A disadvantage of this current method is that the topping materials are required to be made from relatively high quality expensive materials and therefore these materials constitute a major part of the total cost of the finished product. In many cases the properties of the materials can only be modified to a limited degree and not to the extent where they are at optimum levels. For example, the shredded, diced or sliced materials are relatively non free-flowing since they are often sticky or tacky and are thus difficult to dispense in accurate portions. Also, some diced or sliced fruits and vegetables lose moisture at the usual handling temperatures and can become wet and soggy with poor color retention giving an unattractive and unappetizing appearance. Furthermore, many of the topping materials can only be stored for limited periods of time of the order of a few days at chilled temperatures. This means that the manufacturer often cannot take advantage of market price fluctuations by purchasing the materials at minimum prices.

It is an object of the present invention to provide a method and apparatus for producing a frozen free-flowing food product which can be used as a marketable final product in itself or can be used in food preparation processes having advantages over prior food preparation processes.

According to the present invention there is provided a method of preparing frozen free-flowing particles of food product comprising the steps of: supplying a food material, freezing the supplied material to a temperature at which the material is in a frangible state, and then fracturing the frangible frozen material to produce free-flowing particles of frozen food product.

The food material is preferably supplied at a controlled rate and with a controlled surface area enabling the step of freezing of the supplied material to be carried out at a predetermined rate.

The step of freezing the supplied material is preferably carried out by direct heat transfer between the supplied material and a cryogenic substance, although it is still possible according to the invention to use indirect heat transfer such as by bringing the supplied material into contact with a surface at a low temperature, the surface being reduced in temperature by contacting its opposite surface with a cryogenic substance.

In the preferred direct heat transfer method, different ways of effecting such direct heat transfer can be used. For example, the step of freezing the supply material may comprise immersing the supplied material in a bath of liquid cryogenic substance, such as liquid nitrogen, to thereby freeze the supplied material. Alternatively, the step of freezing may comprise spraying the cryogenic substance into direct contact with the supplied material as it is passed through or is held in a freezing zone. As a further alternative possibility, the step of freezing may comprise depositing the supplied material onto solid cryogenic substance, such as a bed of dry ice, so as to thereby freeze the supplied material.

Preferably the temperature which the material reaches during the freezing step is greater than the temperature below which the natural cohesiveness of the food material is insignificant compared to the strength of the cohension caused by crystallisation. This is to ensure that the frozen material is not excessively brittle or crumbly.

The step of fracturing the frozen material is preferably carried out in such a way as to produce free-flowing particles of frozen food product having a particle size smaller than a predetermined maximum size. The method preferably further includes the step of sizing the free-flowing particles of frozen food product so as to separate undersized particles from larger sized particles required as the final particulate food product. The undersized particles may be recycled to supplement the initially supplied food material.

The present invention also provides apparatus for preparing frozen free-flowing particles of food product from an initially supplied food material, the apparatus comprising: freezing means operable to freeze the supplied material to a temperature at which the material is in a frangible state, and fracturing means operable to fracture the frangible frozen material from the freezing means so as to produce free-flowing particles of frozen food product.

In the case where the supplied food material is a liquid or semi-liquid food material, the apparatus preferably includes feeding means for supplying the food material to the freezing means, the feeding means preferably comprising pumping means operable at a selectively controllable pumping rate so as to enable control of the rate of supply of the food material to the freezing means. Also, preferably the pumping means is operable to supply the food material to the freezing means in at least one stream of predetermined diameter so that the stream of food material entering the freezing means has a controlled surface area exposed to heat exchange for freezing purposes.

In the case where the supplied food material is of a viscous consistency, the apparatus preferably includes feeding means for supplying the food material to the freezing means, the feeding means comprising extruding means for extruding the viscous food material through at least one aperture, the extruded food material emerging from the or each apertture being passed to the freezing means. The extruding means may conveniently include an apertured plate through which the food material is forced, the or each aperture being provided in the plate and having a diameter in the range 5 to 25 mm.

The apparatus may further include a temporary storage for receiving frozen food material from the freezing means, and feed means associated with the temporary storage and operable to feed the frozen material from the storage to the fracturing means at a controlled rate.

In one possible construction, the fracturing means comprises a fracturing mill having a container having inner walls and a core located within the container, the core being relatively movable within the container so as to fracture frozen food material in the space between the core and the inner walls. In this case, the container may be provided with a plurality of apertures of a predetermined size through which particles of fractured frozen material are discharged, whereby oversized pieces of frozen food material will be retained within the space in the fracturing mill. Preferably, a predetermined minimum separation from the core outer surface to the inner walls of the container is maintained at all times during relative movement of the core within the container so that the frozen material in the space is not crushed to undesirably small particles.

The particles of fractured frozen food from the fracturing means may be supplied to a grading aperture array, the grading aperture array being operable to separate undersized particles from the larger sized particles required as the final free-flowing particles of frozen food product.

Figure 2:
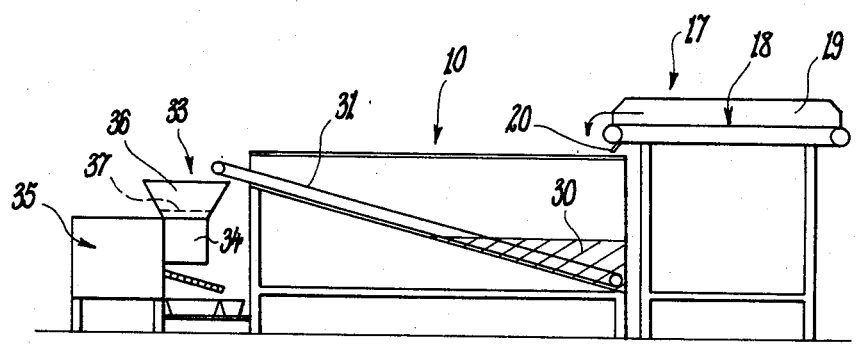
Figure 3:
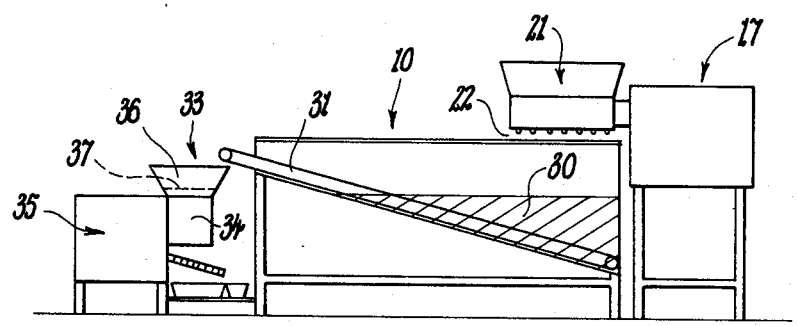
Figure 4:
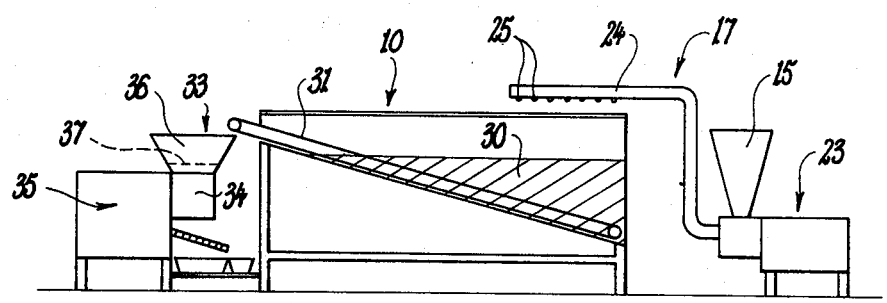
Figure 5:
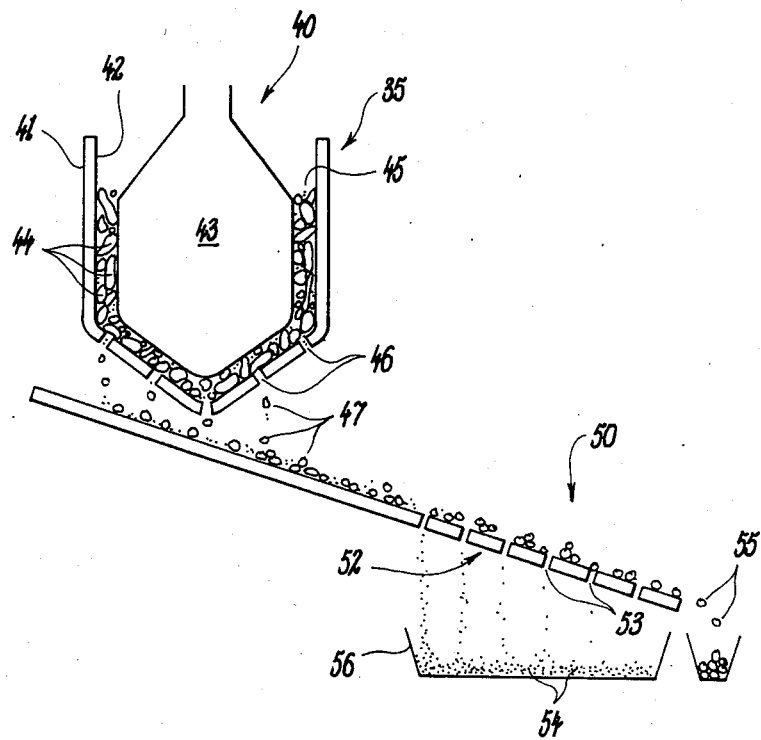

The method and apparatus according to several possible preferred embodiments will now be described in more detail, partially in conjunction with the accompanying drawings, in which:

FIG. 1 is a block schematic flow diagram of a preferred method of preparing frozen free-flowing particles of food product according to the invention, FIG. 2 is a schematic diagram of a first possible embodiment of apparatus according to the invention, FIG. 3 is a similar view to FIG. 2 showing a second possible preferred embodiment of apparatus according to the invention, FIG. 4 is a similar view to FIG. 2 showing a third possible preferred embodiment of apparatus according to the present invention, and FIG. 5 is a schematic view of fracturing means and grading means forming part of the preferred apparatus of the present invention.

The material to be processed by the method or apparatus according to the present invention may be chosen from a wide range of food materials. The food material may comprise solid food such as fruit, vegetables, boned meat or fish or the like. The solid food may be whole or may be precut to a suitable size for processing by the method and apparatus of the invention. Alternatively, the food material may be semi-solid foodstuffs which may be too soft to cut or which may spread excessively under pressure to be handled as particles by standard methods. Such semi-solid foodstuffs include soft fruit, margarine and processed cheese. Further, the food material may be a semi-liquid food which is difficult or impossible to process by methods for handling particulate foods, examples of such semi-liquid foods being fruit pulp, fruit in its own juice, semi-liquid dairy products. Furthermore, the food material may be a liquid food which previously may not have been processed in a particulate form, such liquid foods comprising sauces, concentrates, fresh eggs, etc.

The method and apparatus of the present invention may also be used to process dusty fractions of foodstuffs or by-products of other food processes which until now have often been considered worthless. Such products can be processed according to the invention by addition of a wetting agent or by mixing with a fluid carrier and can be supplied as the food material for the method or apparatus, either alone or mixed with other materials to be processed. For example, food dust and very small particles created in pizza topping preparation can be recycled by addition of a small amount of water or by mixing into hot processed cheese and then mixed with the other initial materials.

Another type of food material which can be used as the initial supply comprises agglomerates or lumps of soft and sticky foodstuffs such as lumps of soft cheese, bacon etc.

It will be appreciated that a food material to be processed can be supplied either as it is naturally or with the addition of, for example, thickeners, stabilizers, water, oil, extenders, preservative or colouring additives or other food materials.

In summary the initial food material may be in the form of a liquid, semi-liquid, paste, semi-solid or solid. It may comprise a single material or a number of food materials blended together. For example, it may be a liquid, semi-liquid, paste or semi-solid food material with solid particles of the same or other materials blended or mixed therein.

The supply of the food material for the first freezing step of the method or to the freezing means 10 of apparatus may be carried out in any suitable manner. For example, the initial food materials may be supplied from a storage means 11 such as hoppers 12,13 (for solids) or tanks 14,15 (for semi-solids, semi-liquids, liquids). The material supplied from the storage means 11 may be optimally passed through a mixing stage 16 where additives or other food materials are mixed with the food material. The mixing of additives or other food materials may be carried out in any suitable conventional manner using known techniques or apparatus.

The supplying of food material to the freezing stage 10 is carried out at a controlled rate in accordance with the capacity of the freezing stage 10. The method and apparatus may be adapted for either batch or continuous operation. Also the supplying of food materials to the freezing stage 10 is carried out such as to control the surface area of the material passing to the freezing stage 10 whereby the freezing can be carried out at a predetermined rate. The freezing rate will depend in part upon the food material surface area since that area has an effect on the capacity for heat transfer during the freezing operation. For example, it is desirable to avoid large agglomerates or lumps of food material which might result in excessive freezing of the outer layers and insufficient freezing of the inner cores of the lumps.

The apparatus of the present invention illustrated in FIGS. 2 to 4 includes feeding means 17 for supplying food material to the freezing means 10.

Referring to FIG. 2, the feeding means 17 illustrated is suitable for whole solid pieces of food material or precut or diced solid food material. The feeding means 17 comprises a feed conveyor 18 having raised sides 19 for confining food material to stay on the conveyor 18. A scraper 20 is arranged to scrape from the conveyor 18 any solid food material that does not fall freely into the freezing means 10. In this particular embodiment, the solid food pieces would be already sized to provide a suitable surface area for heat exchange in the freezing means.

Referring to FIG. 3, where the food material is of a viscous consistency or could be regarded as a semisolid, the feeding means 17 comprises extruding means 21 for extruding the viscous food material through a plurality of apertures from which the food material emerges and passes to the freezing means 10. The extruding means may include an apertured plate 22 illustrated schematically in FIG. 3, and through which the food material is forced by any suitable means. The apertures in the plate 22 may be generally circular, having a diameter in the range 5 to 50 mm, and preferably in the range 5 to 25 mm, the emerging extrusions being generally cylindrical streams of a diameter equal to the aperture diameter. It is expected that an aperture diameter in the range 10 to 15 mm will be suitable for a number of commonly processed food materials. However, the optimum sizes and shapes of the apertures are expected to differ for different food materials. As shown, the extruded product may be gravity fed directly into the freezing means 10.

Referring to FIG. 4, in this case the apparatus is suitable for liquid and semi-liquid food materials. The feeding means 17 comprises pumping means 23 operable at a selectively controllable pumping rate so as to enable control of the rate of supply of the food material from the tank 15 to the freezing means 10. The pumping means 23 delivers food material to the manifold 24 which is provided with a plurality of nozzles 25 operable to deliver streams of material of a predetermined diameter so that the streams of food material entering the freezing means 10 have controlled surface areas exposed to heat exchange for freezing purposes.

The step of freezing the supplied food material is preferably carried out by direct or indirect heat transfer between the food material and a cryogenic substance constituting the refrigerant. The cryogenic substance may be a liquid such as liquid nitrogen or liquid carbon dioxide, or may be in a gaseous or solid form such as solid $CO_2$ in the form of dry ice or $CO_2$ snow. Of course, combinations of these cryogenic substance phases can be used such as by injecting liquid $CO_2$ into a freezing zone where a mixture of gaseous and solid $CO_2$ snow will be formed, the food material being passed into the freezing zone into heat exchange relationship with the $CO_2$ gas and snow.

The heat transfer from the food material to the cryogenic substance to achieve freezing of the food material may be effected by direct contact of the food material with the cryogenic substance. For example, referring to FIGS. 2 to 4, the step of freezing the supplied material comprises immersing the supplied material in a bath 30 of liquid cryogenic substance such as liquid nitrogen, to thereby freeze the supplied material. Alternatively, the step of freezing the supplied material may comprise spraying the cryogenic substance into direct contact with the supplied material as it is passed through or is held in the freezing zone of the freezing means 10. A further possible alternative comprises depositing the supplied material onto solid cryogenic substance such as a bed of solid $CO_2$ "dry ice" so as to thereby freeze the material.

The use of cryogenic substance for the freezing operation is preferred since such a freezing system is relatively fast compared to mechanical refrigeration systems. This fast freezing is desirable so that the food material will freeze before having a chance to coalesce into large lumps.

The temperature to which the food material is frozen and at which it emerges from the freezing means 10 is chosen so that the frozen food material will be frangible. Generally, this temperature will be lower than that which can be achieved by conventional mechanical refrigeration systems. However, the temperature is preferably controlled such that the frozen food material emerging from the freezing means 10 is not too brittle or crumbly. Therefore, the temperature is preferably greater than the temperature below which the natural cohesiveness of the food material is insignificant compared to the strength of cohesion caused by crystallisation. Also, freezing of the material to an extremely low temperature is expected to be wasteful of the heat extraction capacity of the cryogenic substance. The optimum temperature of the frozen food material emerging from the freezing stage is expected to vary for different food materials. The temperature is expected to be within the range $0°$ C. to $-196°$ C., and for most materials is expected to be within the range $0°$ C. to $-100°$ C.

The output of the freezing step of the process and freezing means 10 of the apparatus according to the preferred arrangement will comprise pieces of frozen food material. For example, in the case where viscous food material is supplied to the freezing stage as an extrusion, the material will freeze in its extruded form and therefore the output of the freezing stage will comprise generally cylindrical lengths of food product. In the case of liquids or semi-liquids dropped or streamed into the freezing stage, the output may comprise spherical or irregular shaped chunks of frozen material. In FIGS. 2 to 4, where the food material is immersed in a bath 30 of liquid cryogenic substance, the frozen food material may be collected from the bath 30 by means of wire conveyor 31 which discharges the frozen food product from the freezing means 10.

The output of the freezing stage may be conveyed to storage 32 (FIG. 1). For example, the output may be stored in containers and transferred to a conventional freezer for relatively long term storage before further processing. Conventional freezers will maintain the frozen material in a free-flowing state, but the temperature may be above the temperature at which the material is frangible. Hence, the storage may need to be followed by a temperature reduction to render the material frangible to complete the process according to the invention.

Alternatively, the output frangible frozen food material from the freezing stage may be passed to a temporary storage 33 (FIGS. 2 to 4). Feed means 34 associated with the temporary storage 33 is operable to feed the frozen material from the temporary storage 33 to fracturing means 35 at a controlled rate. For example, the temporary storage 33 may comprise hopper 36 receiving the frozen material from conveyor 31 and having the feed means 34 associated with the hopper 36. The feeding of the frozen material from the hopper 36 to the fracturing means 35 may be by gravity feed of the material from a discharge opening in the lower portion of the hopper 36. The material may be funnelled to the discharge opening and to avoid bridging of the material across the funnelled portion, the hopper 36 may be vibrated or otherwise periodically disturbed. A grid 37 is provided in the lower part of the hopper 36 to allow frozen pieces not exceeding the capacity of the fracturing means 35 to be gravity fed from the hopper discharge opening.

The frangible frozen food material is next fractured in fracturing stage 35 to produce free flowing particles of frozen food product. The fracturing operation is carried out without reducing the frangible frozen material to very small or dust-like particles.

Since the fracturing operation is carried out on material which is frozen to a temperature at which the material is frangible, the particles produced by the fracturing operation will include a substantial proportion of fracture surfaces in the particular product. Fracture surfaces provide an attractive and appetizing appearance with excellent color retention.

The fracturing means 35 of the apparatus of the invention may be in the form of a horizontal or vertical fracturing mill 40. Referring to FIG. 5, the mill 40 includes a container 41 having inner walls 42 and a core 43 located within the container 41. The core 43 is relatively movable within the container 41 so as to fracture frozen food material in the space 45 between the core 43 and the inner walls 42. In particular, the container 41 is preferably stationary and the core 43 rotates or oscillates within the container 41. The container 41 is provided with a plurality of discharge apertures in the lower portions thereof, the discharge apertures 46 having a predetermined size and through which particles 47 of fractured frozen material smaller than the aperture size are discharged. By this means, oversize pieces and particles will be retained within the space 45 in the fracturing mill 40 until they are fractured to product particles small enough to pass through the apertures 46.

The core 43 of the mill 40 moves or oscillates concentrically or eccentrically within the container 41, with a predetermined minimum separation from the outer surface of the core 43 to the inner walls 42 of the container 41 being maintained at all times during movement of the core so that the frozen material 44 is not crushed or ground to undesirably small particles.

Thus, it is clear that the step of fracturing the frozen material 44 comprises producing free flowing particles 47 of frozen food product having a particle size smaller than a predetermined maximum size determined by the diameter of the apertures 46 in the container 41. The preferred method of the invention includes the step of sizing the free-flowing particles of frozen food product in sizing stage 50 so as to separate undersized particles from larger sized particles required as the final particulate food product. The undersized particles may be recycled to supplement the initially supplied food material either directly via mixing stage 16 or after having been passed to storage stage 51. Of course, if desired, the particles 47 from the fracturing stage 35 may comprise the final product without need for passing the particles through sizing stage 50.

Referring again to FIG. 5, the sizing stage 50 may comprise a grading aperture array 52 to which the particles of fractured frozen food 57 from the fracturing means 35 are supplied. The grading aperture array 52 provides relatively small sized apertures 53 so as to separate undersized particles 54 from the larger sized particles 55 required as the final free-flowing particles of frozen food product.

The grading aperture array 52 may be provided by means of a grid, sieve or apertured plate or the like to which the particulate outout 47 from the apertures 46 is supplied. Effectively, this enables the "fines" to be screened out. The undersized particles 54 can be collected in container 56 and, as mentioned previously, can be recycled and used as an input supplement for the initial supply of food material. With the use of different sizes of both apertures 46 and apertures 53, the final product 55 can be closely controlled as to particle size with undersized particles 54 being returned for reprocessing.

The preferred method and apparatus of the present invention described above produces a final product consisting of small hard frozen food pieces of irregular shape whose size will depend upon the diameter of the apertures 46 in the fracture mill 40 and upon the size of the apertures 53 in the grading aperture array 52. A final particle size of between 5 and 12 mm and preferably between 8 and 12 mm general diameter has been found to be suitable for a number of topping materials.

The final product 55 is free-flowing and is suitable for depositing on or adding in the frozen state to other processed or unprocessed food products. The free flowing product may itself by coated by other food materials using generally conventional processes. Also, the final product 55 may be packed as a salable product on its own in the frozen state for use by domestic, commercial or industrial consumers. An example of use of the final particulate food product is in the depositing of discrete portions by automatic means on preformed pastry or cake bases or similar products.

The final product is also suitable for storing in the free-flowing frozen state in suitable receptables such as plastics bins or bags in commercial freezer rooms operating at temperatures generally within the range of $-15°$ C. to $-30°$ C.

The initial food material may be a low grade relatively cheap raw or processed food material which can be modified to enhance its desirable properties by the addition of appropriate food additives such as stabilizers, extenders, binders, flavourings and so on, with the result that the final product is equivalent to or even better than the equivalent material currently being used by particular industries, such as the preformed pizza industry.

The bulk volume of a product may be increased, its water retention characteristics improved, its flavor and color enhanced and its freezing characteristics can be modified to better suit the manufacture and storage steps. Also, if needed, the melting characteristics can be modified to give a better product after the baking step carried out by the consumer. Overall, it will be seen that the properties of the product can be tailored to achieve a variety of desired end results.

One specific example of use of the process and apparatus is the use of low cost pineapple pulp instead of the more expensive pineapple slices currently used in preformed pizzas. The use of low cost pineapple pulp enables the production of frozen free-flowing "diced" pineapple pieces.

Another example of use of the process and apparatus is the use of low cost low grade processed cheese instead of the more expensive Mozzarella cheese for pizza topping. The volume of the low quality cheese can be increased by means of extenders, its flavor enhanced and other properties modified before it is made into small frozen free-flowing pieces. Its properties may be modified to the extent that the small pieces can be made to retain their general shape during the baking step with just the desired degree of melting.

Other examples of use of the invention include the production of good quality frozen free-flowing fish pieces from low grade minced fish products.

The process may also be used to produce frozen free-flowing fruit pieces such as strawberries, apricots, apples, raspberries, peaches, etc. from the cheaper fruit pulp rather than from the solid fruit. Further economies may be made by using in whole or in part low cost apple pulp as the base material and adding a portion of the required fruit and/or flavouring material to simulate a particular fruit before the freezing and "dicing" (fracturing) step.

Generally, it will be seen that the invention allows the upgrading of some low cost, low grade food materials so that they are as salable as or even more attractive than some equivalent high cost grade food materials.

Finally, it is to be understood that various alterations, modifications and/or additions may be made to the construction and arrangement of parts and steps as herein described without departing from the scope of the present invention as defined in the appended claims.

I claim:

1. Process for preparing frozen free-flowing particles of food product, comprising the steps of: extruding a viscous or semi-solid food material through at least one aperture having a diameter comprised between 5 and 50 mm, freezing said extruded food material by direct heat exchange with a cryogenic substance at a temperature sufficiently low to ensure frangibilization and thus freezing to the inner core of said food material, fracturing the thus-frangibilized said food material to produce free-flowing fractured particles, and sizing the fractured particles to recover particles having a granulometry comprised between 5 and 12 mm.

2. Apparatus for preparing frozen free-flowing particles of food product from an initially supplied viscous or semi-solid food material, the apparatus comprising: extruding means to extrude said food material, said extruding means having at least one extrusion aperture, said extrusion aperture having a diameter comprised between 5 and 50 mm; freezing means disposed beneath said extruding means to freeze the extruded food material to a temperature at which the material is in a frangible state and thus frozen to its inner core; fracturing means to fracture the frangible frozen material from the freezing means so as to produce free flowing particles of a frozen food product; and sizing means to size the fractured particles and recover particles having a granulometry comprised between 5 and 12 mm.

* * * * *